(12) United States Patent
Kawano et al.

(10) Patent No.: US 6,549,342 B2
(45) Date of Patent: Apr. 15, 2003

(54) FINDER OPTICAL SYSTEM

(75) Inventors: Kiyoshi Kawano, Saitama-ken (JP); Moriyasu Kanai, Saitama-ken (JP)

(73) Assignee: Pentax Corporation, Tokyo (JP)

( * ) Notice: Subject to any disclaimer, the term of this patent is extended or adjusted under 35 U.S.C. 154(b) by 0 days.

(21) Appl. No.: 09/729,955

(22) Filed: Dec. 6, 2000

(65) Prior Publication Data

US 2001/0003495 A1 Jun. 14, 2001

(30) Foreign Application Priority Data

Dec. 8, 1999 (JP) .......................................... 11-348973

(51) Int. Cl.[7] .............................................. G02B 17/02
(52) U.S. Cl. ........................ 359/733; 359/726; 396/386
(58) Field of Search ...................... 359/726, 733–736, 359/754–756, 763, 771, 784, 643–646, 362–363; 396/354, 373, 384–386; 348/335, 340–341

(56) References Cited

U.S. PATENT DOCUMENTS

| | | | | |
|---|---|---|---|---|
| 5,166,718 A | * | 11/1992 | Suzuki et al. ................ | 396/111 |
| 5,848,308 A | * | 12/1998 | Kawamura ................... | 396/374 |
| 6,081,374 A | | 6/2000 | Abe et al. ................... | 359/431 |
| 6,130,714 A | | 10/2000 | Abe et al. ................... | 348/335 |
| 6,324,018 B1 | * | 11/2001 | Kawamura ................... | 359/687 |

FOREIGN PATENT DOCUMENTS

| | | | |
|---|---|---|---|
| JP | 9325268 | | 12/1997 |
| JP | 10312004 | | 11/1998 |
| JP | 2000-147603 | * | 5/2000 |

* cited by examiner

*Primary Examiner*—Jordan M. Schwartz
(74) *Attorney, Agent, or Firm*—Greenblum & Bernstein, P.L.C.

(57) ABSTRACT

A finder optical system for a single lens reflex camera is provided with a photographing optical system, a beam splitter for splitting light passed through the photographing optical system. First light deflected by the beam splitter forms a primary image at a position downstream from the beam splitter. Second light passed through the beam splitter is incident on a CCD. A relaying optical system is arranged on an optical path of the light deflected by the optical element to relay the primary image to form a secondary image. A reflection surface is arranged between the relaying optical system and an eyepiece optical system. The reflection surface deflects light, which is directed from the relaying optical system, toward the eyepiece optical system, to proceed in a direction parallel with an optical axis of the photographing optical system. The secondary image is formed between the reflection surface and the eyepiece optical system.

Figure 1:
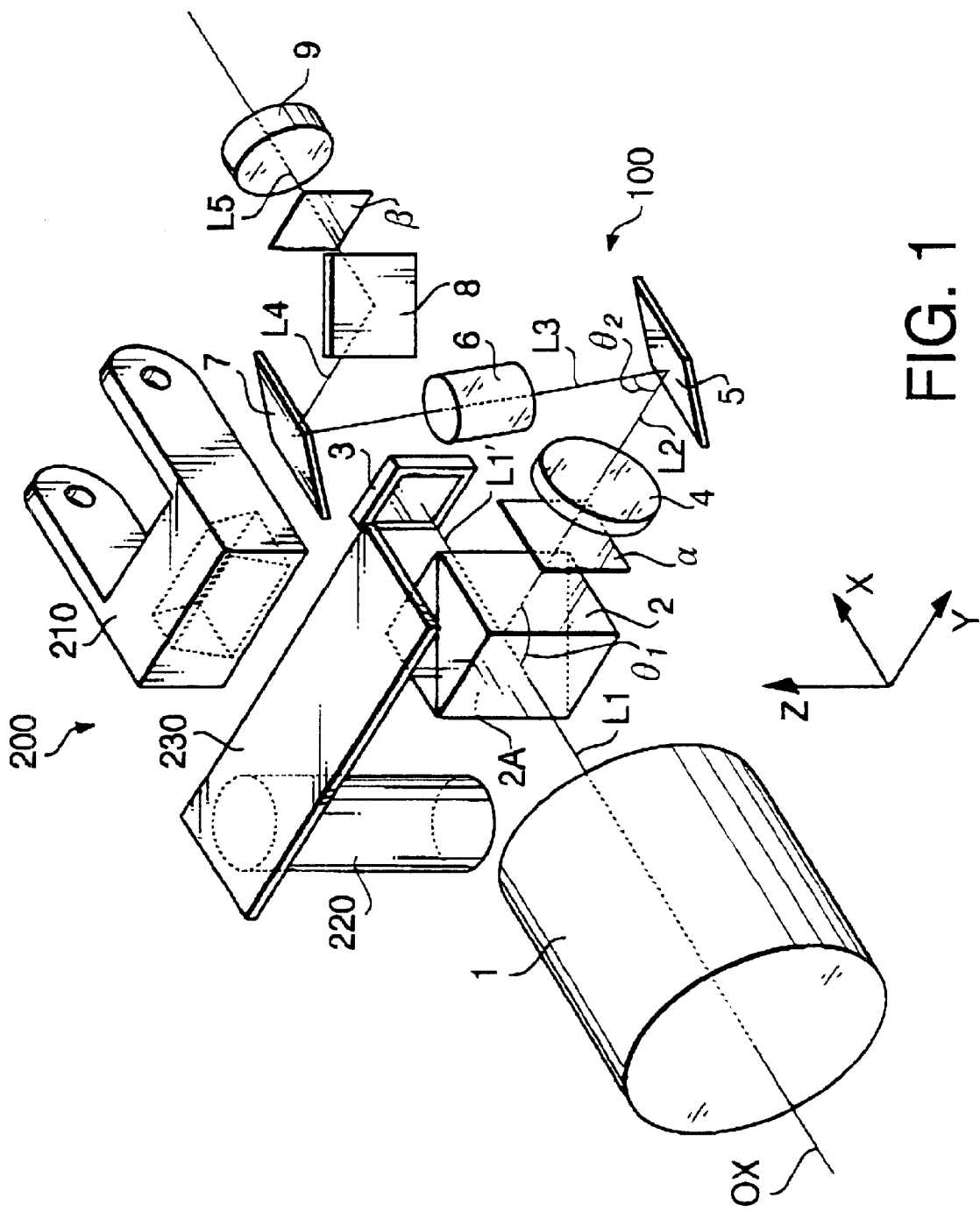

8 Claims, 2 Drawing Sheets

FINDER OPTICAL SYSTEM

BACKGROUND OF THE INVENTION

The present invention relates to a finder optical system for single lens reflex (SLR) cameras, and more particularly to a finder optical system for a single-lens reflex camera using an image capturing element such as a CCD (Charge Coupled Device) instead of a photographing film.

Conventionally, an SLR camera has been widely used. In the SLR camera, light passed from a photographing lens is introduced to a finder optical system. Recently, SLR cameras using an image capturing element such as a CCD have been developed and become widespread. In such an SLR camera (i.e., a digital SLR camera), since the area of an image receiving surface of the CCD is relatively small, an image formed by a photographing optical system should be made smaller in comparison with a case where the image is formed on the photographing film.

If the SLR camera is configured such that the image formed on the CCD is small, an image observed through a finder is also small. Therefore, in order to retain a sufficient size of an object image, a magnification of the finder optical system should be sufficiently high.

Recently, the digital cameras are required to be downsized. Therefore, in order to make a structure of the digital camera simple and compact, the finder optical system is also required to achieve the high magnification, and to have an appropriate positional relationship with respect to the other components such as a strobe unit to meet the requirement for downsizing.

SUMMARY OF THE INVENTION

It is therefore an object of the invention to provide an improved finder optical system which has a sufficiently high finder magnification and is arranged to have an appropriate positional relationship with respect to the other components of the camera.

For the above object, according to an aspect of the invention, there is provided a finder optical system for a single lens reflex camera, which is provided with a photographing optical system, light from an object being converged by the photographing optical system, an Image of the object being formed on an imaging surface, an optical element inserted in an optical path of the converging light emerged from the photographing optical system, the optical element splitting light passed through the photographing optical system into first light which is deflected by the optical element and second light which passes through the optical element, the first light forming a primary image at a position downstream from the optical element, the second light being incident on the imaging surface to form an object image, a relaying optical system arranged on an optical path of the light deflected by the optical element, the relaying optical system relaying the primary image to form a secondary image, an eyepiece optical system through which the secondary image is observable, and a first reflection surface arranged between the relaying optical system and the eyepiece optical system, the first reflection surface deflecting light, which is directed from the relaying optical system toward the eyepiece optical system, to proceed in a direction parallel with an optical axis of the photographing optical system. In this structure, the secondary image is formed between the first reflection surface and the eyepiece optical system.

Since the secondary image is formed between the first reflection surface and the eyepiece optical system, the magnification of the finder system can be made greater with a compact structure.

optionally, the finder optical system may further include a second reflection surface arranged between the relaying optical system and the first reflection surface, the second reflection surface deflecting light emerged from the relaying optical system toward the first reflection surface, and a third reflection surface arranged between the optical element and the relaying optical system. The third reflection surface deflects the first light deflected by the optical element In a direction inclined with respect to a plane including the first light deflected by the optical element and the optical axis of the objective optical system. The light deflected by the second reflection surface and directed toward the first reflection surface is substantially parallel with the light which is deflected by the optical element and directed to the third reflection surface.

The finder optical system may satisfy the following condition:

$$80° \leq \theta_1 \leq 100°,$$

wherein, $\theta_1$ represents an angle formed between the first light deflected by the optical element and the optical axis of the photographing lens.

Optionally, the finder optical system may satisfy the following condition:

$$55° \leq \theta_2 \leq 100°$$

wherein, $\theta_2$ represents an angle formed between the optical path of the first light deflected by the optical element and the optical path of the light reflected by the third reflection surface.

Further optionally, each of the first, second, and third reflection surfaces is a surface of a mirror.

Still optionally, the finder optical system may further include a condenser lens arranged between the optical element and the third reflection surface, the finder optical system satisfying the following condition:

$$0.1 \times fe < d$$

wherein, fe represents a composite focal length of the relaying optical system and the eyepiece optical system, and wherein d represents a distance between a first focal plane, on which the primary image is formed, and a first focal plane side surface of the condenser lens.

The finder optical system may also satisfy the following condition:

$$-1.4 < M < -0.7$$

wherein, M represents a composite magnification of the condenser lens and the relaying optical system.

Furthermore, the imaging surface may be an image receiving surface of an image capturing element.

According to another aspect of the invention, there is provided a camera, which is provided with a camera body having a substantially rectangular parallelepiped shape, a photographing optical system, light from an object being converged by the photographing optical system, an image of the object being formed on an imaging surface, an optical element inserted in an optical path of the converging light emerged from the photographing optical system, the optical element splitting light passed through the photographing optical system into first light which is deflected by the optical element and second light which passes through the optical element, the first light forming a primary image at a position downstream from the optical element, the second light being incident on the imaging surface to form an object image, a relaying optical system arranged on an optical path of the light deflected by the optical element, the relaying optical system relaying the primary image to form a secondary image, an eyepiece optical system through which the secondary image is observable, and a first reflection surface arranged between the relaying optical system and the eyepiece optical system, the first reflection surface deflecting light, which is directed from the relaying optical system toward the eyepiece optical system, to proceed in a direction parallel with an optical axis of the photographing optical system. In this structure, the secondary image is formed between the first reflection surface and the eyepiece optical system, and the first light is deflected by the optical element in a direction perpendicular to the optical axis of the photographing lens and parallel with a longer side of the camera.

BRIEF DESCRIPTION OF THE ACCOMPANYING DRAWINGS

Figure 2:
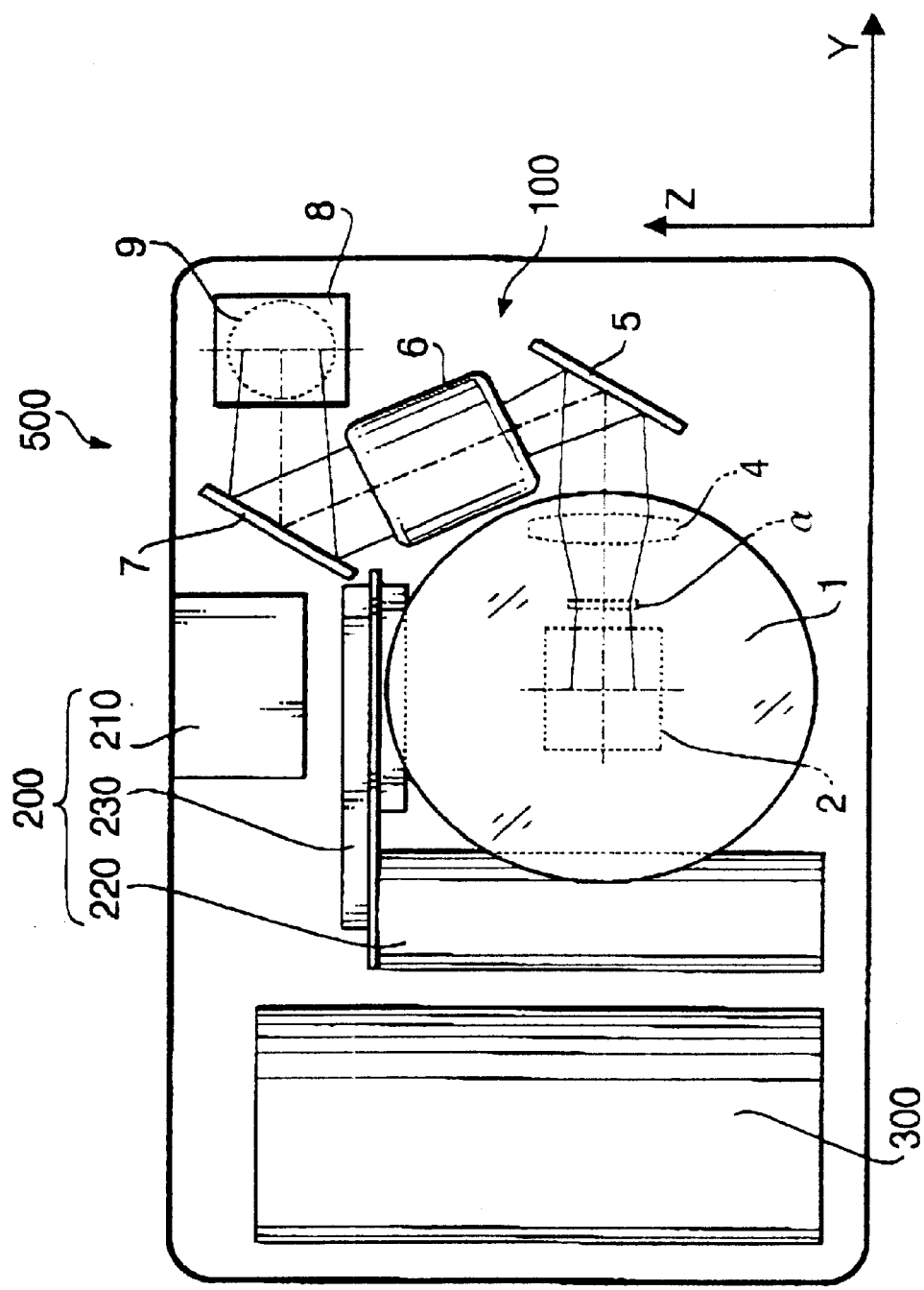

FIG. 1 schematically shows a perspective view of an inner structure of an SLR (single lens reflex) camera employing a finder optical system according to an embodiment of the present invention; and FIG. 2 schematically shows the inner structure of the SLR camera viewed from the front side of the camera.

DETAILED DESCRIPTION OF THE EMBODIMENTS

Hereinafter, a finder optical system 100 according to an embodiment of the present invention will be described with reference to the accompanying drawings.

FIG. 1 schematically shows a perspective view of an inner structure of a camera provided with the finder optical system 100. The finder optical system 100 includes a photographing lens 1, a beam splitter 2, a CCD (Charge Coupled Device) 3, a condenser lens 4, a mirror 5 (a third reflection surface), a relaying optical system 6, a mirror 7 (a second reflection surface), a mirror 8 (a first reflection surface), and an eyepiece optical system 9.

FIG. 2 schematically shows the inner structure of the camera viewed from the front side thereof. The camera further includes, a strobe unit 200 and a battery 300. The strobe unit 200 is provided with a light source unit 210, a strobe condenser 220 and a strobe circuit 230.

As shown in FIGS. 1 and 2, in this specification, XYZ rectangular coordinate system is introduced to indicate directions. A direction in which an optical axis OX of the photographing lens 1 extends is indicated by arrow X (i.e., X-axis), and arrows Y and Z (i.e., Y- and Z-axes) respectively indicate directions perpendicular to X-axis. A right-and-left direction of the camera 500 in FIG. 2 is indicated by arrow Y, and an up-and-down direction of the camera 500 in FIG. 2 is indicated by arrow Z.

As shown in FIG. 1, light L1 passed through the photographing lens 1 and proceeds along X-axis is Incident on the beam splitter 2. The beam splitter 2 has a half mirror surface 2A. The light incident on the half mirror surface 2A is split into first light L2 that is reflected by the half mirror surface 2A at a predetermined angle with respect to the optical axis OX of the photographing lens 1, and second light L1' that passes through the half mirror surface 2A and impinges on the CCD 3 which is arranged on the optical axis OX. The first light L2 deflected by the half mirror surface 2A is directed toward the condenser lens 4.

It should be noted that the half mirror surface 2A is arranged such that following condition (1) is satisfied:

$$80°\leq \theta_1 \leq 100° \quad (1)$$

where, $\theta_1$ represents an angle formed between optical paths of the first light L2 and the light L1.

If $\theta_1$ is less than 80°, the inner structure of the camera 500 will be larger, while, if $\theta_1$ is greater than 100°, the arrangements of components of the finder optical system 100 may interfere with each other. In this preferred embodiment, the angle $\theta_1$ is 90°, and therefore, condition (1) is satisfied.

The second light L1' passed through the half mirror surface 2A is then incident on the CCD 3. The light receiving surface of the CCD 3 is arranged in parallel with a Y-Z plane, a center of the CCD 3 being positioned on the optical axis of the photographing lens 1. Accordingly, the second light L1' is incident on all the pixels of the image receiving surface of the CCD 3.

The first light L2 reflected by the half mirror surface 2A forms an inverted image (the primary image) on a first focal plane α extending in parallel with an X-Z plane. A distance from the first focal plane α to the half mirror surface 2A is substantially equal to a distance from the CCD 3 to the half mirror surface 2A.

The first light L2 further proceeds and is incident on the mirror 5 (the third reflection surface) via the condenser lens 4. The first light L2 is then reflected by the mirror 5, and proceeds, as light L3, toward the relaying optical system 6, in a direction that is parallel to the Y-Z plane. It should be noted that the mirror 5 is arranged so that condition (2) is satisfied:

$$55°\leq \theta_2 \leq 100° \quad (2)$$

where, $\theta_2$ represents an angle defined between optical paths of the first light L2 and the light L3 on a Y-Z plane.

If $\theta_2$ is greater than 100°, the structure of the camera 500 will be larger, while, if $\theta_2$ is less than 55°, the arrangements of components of the finder optical system 100 may interfere with each other.

The condenser lens 4 is provided in order to converge the light L2 after the primary image is formed, and to prevent the vignetting by the eyepiece optical system 9. The relaying optical system 6 is provided In order to form an image, which is conjugate with the primary image formed on the first focal plane α, on a second focal plane β.

In order to avoid the dust or the like adhered onto the condenser lens 4 from obscuring the observation through the eyepiece optical system 9, the condenser lens 4 is configured to satisfy condition (3) below:

$$0.1 \times fe < d \quad (3)$$

where, fe represents a composite focal length of the relaying optical system 6 and the eyepiece optical system 9, and d represents a distance from the first focal plane α to the first focal plane a side surface of the condenser lens 4.

In order to achieve a high finder magnification as well as downsizing of the finder optical system 100, it is preferable that a composite magnification M of the condenser lens 4 and the relaying optical system 6 satisfies the following condition (4):

$$-1.4 < M < -0.7 \quad (4)$$

If M is greater than −0.7, the finder optical system 100 does not have a sufficiently high finder magnification, i.e., the object observed through the finder is too small. If M is less than −1.4, it becomes necessary to have a large eyepiece optical system 9, and therefore the entire finder optical system 100 is upsized.

The light L3 emerged from the relaying optical system 6 is reflected by the mirror 7 (the second reflection surface) and proceeds, as light L4, in a direction parallel to the optical path of the light L2 (i.e., in the Y-axis direction). The light L4 is then reflected by the mirror 8 (the first reflection surface) and proceeds, as light L5, in a direction parallel to the optical axis OX of the photographing lens 1 (i.e., in the X-axis direction).

The light L5 deflected by the mirror 8 forms an erected image (the secondary image) on a second focal plane β, which is parallel with the Y-Z plane and is located between the mirror 8 and the eyepiece optical system 9. The secondary image can be observed with being magnified, at an eye point (not shown), through the eyepiece optical system 9.

In this preferred embodiment, since the secondary image is formed after the light L5 was reflected by the mirror 8, a focal length of the eyepiece optical system 9 can be made relatively short. Accordingly, the finder magnification of the finder optical system 100 can be made higher than the conventional finder optical system.

Further, when a diopter adjustment is performed by moving the eyepiece optical system 9 or a part of the same, since a moving amount is approximately proportional to a square of the focal length of the eyepiece optical system 9 (or the part thereof) to be moved, the moving amount for the diopter adjustment can be decreased, and, an adjustable range of the diopter adjustment can be widened.

Incidentally, in a conventional finder optical system, the first reflection surface, which corresponds to the mirror 8 of the preferred embodiment, is positioned downstream of the second focal plane, and the first reflection surface is positioned between the second focal plane and an eyepiece optical system. In such a configuration, a focal length of the eyepiece optical system must be made longer in comparison to the structure according to the embodiment described above. Therefore, the conventional finder optical system does not have the above-described advantages.

Additionally, when the finder optical system 100 is employed in a camera, the following effect is obtained.

As shown in FIG. 2, in the camera 500 employing the finder optical system 100, when the camera 500 is positioned to photograph a landscape picture, the light source unit 210 is arranged above the beam splitter 2. Further, the strobe circuit 230 integrated with the strobe condenser 220 can be arranged at a space defined between the photographing lens 1 and the light source unit 210. With this structure, since the strobe circuit 230 and the light source unit 210 are closely arranged, the strobe unit 200 can be made compact. Accordingly, the finder optical system 100, the strobe unit 200 and the battery unit 300 can be arranged closely.

It should be noted that the present invention is not limited to the configuration according to the embodiment. For example, although the finder optical system 100 in the above preferred embodiment employs the beam splitter 2 as a beam splitting element, a half mirror can also be used in order to separate the luminous flux L1 emerged from the photographing lens 1. Alternatively, the beam splitting element may be replaced with a conventionally employed quick return mirror.

As described above, according to the present invention, since the secondary image is formed at a position downstream from the first reflection surface, the finder magnification can be made higher. Further, moving amount of the eyepiece optical system for the diopter adjustment can be decreased, with retaining a sufficiently wide adjustable range.

Furthermore, in the camera employing the finder optical system of the present invention, since the finder optical system, the strobe member, and the battery are arranged closely adjacent to each other, the inner structure of the camera can be made simple and compact.

The present disclosure relates to the subject matter contained in Japanese Patent Application No. HEI 11-348973, filed on Dec. 8, 1999, which is expressly incorporated herein by reference in its entirety.

What is claimed is:

1. A finder optical system for a single lens reflex camera, comprising:

a photographing optical system, light from an object being converged by said photographing optical system, an image of the object being formed on an imaging surface;

an optical element inserted in an optical path of the converging light emerged from said photographing optical system, said optical element splitting light passed through said photographing optical system into first light which is deflected by said optical element and second light which passes through said optical element, the first light forming a primary image at a position downstream from said optical element, the second light being incident on said imaging surface to form an object image;

a relaying optical system arranged on an optical path of the light deflected by said optical element, said relaying optical system relaying the primary image to form a secondary image;

an eyepiece optical system through which the secondary image is observable; and a first reflection surface arranged between said relaying optical system and said eyepiece optical system, said first reflection surface deflecting light, which is directed from said relaying optical system toward said eyepiece optical system, to proceed in a direction parallel with an optical axis of said photographing optical system, a second reflection surface arranged between said relaying optical system and said first reflection surface, said second reflection surface deflecting light emerged from said relaying optical system toward said first reflection surface; and a third reflection surface arranged between said optical element and said relaying optical system, said third reflection surface deflecting the first light deflected by said optical element in a direction inclined with respect to a plane including the first light deflected by said optical element and the optical axis of said photographing optical system, wherein:

the light deflected by said second reflection surface and directed toward said first reflection surface is substantially parallel with the light which is deflected by said optical element and directed to said third reflection surface; and said secondary image is formed between said first reflection surface and said eyepiece optical system.

2. The finder optical system according to claim 1, satisfying a condition:

$$80° \leq \theta_1 \leq 100°,$$

wherein, $\theta_1$ represents an angle formed between the first light deflected by the optical element and the optical axis of said photographing optical system.

3. The finder optical system according to claim 1, satisfies a condition:

$$55° \leq \theta_2 \leq 100°$$

wherein, $\theta_2$ represents an angle formed between the optical path of the first light deflected by said optical element and the optical path of the light reflected by said third reflection surface.

4. The finder optical system according to claim 1, wherein each of said first, second, and third reflection surface is a surface of a mirror.

5. The finder optical system according to claim 1, further comprising a condenser lens arranged between said optical element and said third reflection surface, said finder optical system satisfying a condition:

$$0.1 \times fe < d$$

wherein, fe represents a composite focal length of said relaying optical system and said eyepiece optical system, and wherein d represents a distance between a first focal plane, on which said primary image is formed, and a first focal plane side surface of said condenser lens.

6. The finder optical system according to claim 5, satisfying a condition:

$$-1.4 < M < -0.7$$

wherein, M represents a composite magnification of said condenser lens and said relaying optical system.

7. The finder optical system according to claim 1, wherein said imaging surface is an image receiving surface of an image capturing element.

8. A camera, comprising:

a camera body having a substantially rectangular parallelepiped shape;

a photographing optical system, light from an object being converged by said photographing optical system, an image of the object being formed on an imaging surface;

an optical element inserted in an optical path of the converging light emerged from said photographing optical system, said optical element splitting light passed through said photographing optical system into first light which is deflected by said optical element and second light which passes through said optical element, the first light forming a primary image at a position downstream from said optical element, the second light being incident on said imaging surface to form an object image;

a relaying optical system arranged on an optical path of the light deflected by said optical element, said relaying optical system relaying the primary image to form a secondary image;

an eyepiece optical system through which the secondary image is observable;

a first reflection surface arranged between said relaying optical system and said eyepiece optical system, said first reflection surface deflecting light, which is directed from said relaying optical system toward said eyepiece optical system, to proceed in a direction parallel with an optical axis of said photographing optical system;

a second reflection surface arranged between said relaying optical system and said first reflection surface, said second reflection surface deflecting light emerged from said relaying optical system toward said first reflection surface; and a third reflection surface arranged between said optical element and said relaying optical system, said third reflection surface deflecting the first light deflected by said optical element in a direction inclined with respect to a plane including the first light deflected by said optical element and the optical axis of said photographing optical system, wherein the light deflected by said second reflection surface and directed toward said first reflection surface is substantially parallel with the light which is deflected by said optical element and directed to said third reflection surface, wherein said secondary image is formed between said first reflection surface and said eyepiece optical system, and wherein said first light is deflected by said optical element in a direction perpendicular to the optical axis of said photographing optical system and parallel with a longer side of said camera.

* * * * *